US008459998B2

United States Patent
Thomas

(10) Patent No.: US 8,459,998 B2
(45) Date of Patent: Jun. 11, 2013

(54) DISPLAY FOR VISUALLY ESTIMATING FOOD PORTION SIZES

(76) Inventor: Sara Lee Thomas, Madras, OR (US)

( * ) Notice: Subject to any disclaimer, the term of this patent is extended or adjusted under 35 U.S.C. 154(b) by 1274 days.

(21) Appl. No.: 11/903,333

(22) Filed: Sep. 21, 2007

(65) Prior Publication Data

US 2008/0076096 A1 Mar. 27, 2008

Related U.S. Application Data

(60) Provisional application No. 60/826,404, filed on Sep. 21, 2006.

(51) Int. Cl.
G09B 19/00 (2006.01)

(52) U.S. Cl.
USPC .......................................... 434/127

(58) Field of Classification Search
USPC .......................................... 434/127; 220/669
See application file for complete search history.

(56) References Cited

U.S. PATENT DOCUMENTS

| 3,902,256 | A | * | 9/1975 | Liu ................................ 434/340 |
| 4,593,817 | A | * | 6/1986 | Ferrero ......................... 206/457 |
| 5,478,990 | A | * | 12/1995 | Montanari et al. ............ 235/375 |
| 5,636,740 | A | * | 6/1997 | Finkiewicz et al. ........... 206/457 |
| 6,023,822 | A | * | 2/2000 | Luebke ............................. 27/1 |
| 6,330,760 | B1 | * | 12/2001 | Wolgast ........................... 40/324 |
| 6,428,320 | B1 | * | 8/2002 | Archuleta et al. ............ 434/127 |
| 6,742,821 | B2 | | 6/2004 | Kleinpell |
| 6,785,938 | B1 | * | 9/2004 | Johansen, Jr. ..................... 27/1 |

* cited by examiner

*Primary Examiner* — Kesha Y. Frisby
(74) *Attorney, Agent, or Firm* — James Ray & Assoc

(57) ABSTRACT

A display having each portion thereof equivalent to a predetermined food portion size for providing an individual with a visual reference to estimate an amount of food the individual is eating. The display includes at least one figurine having a body member with a predetermined shape. The body member includes a label for identifying a portion size that it is equivalent to. A head member, having a predetermined shape, is attached to the body member. The head member includes a label for identifying a portion size that it is equivalent to. A predetermined plurality of at least one of leg members and arm members, having a predetermined shape, are attached to the body member. Each one of the predetermined pluralities of at least one of leg members and arm members includes a label for identifying a portion size that each one is equivalent to.

10 Claims, 2 Drawing Sheets

DISPLAY FOR VISUALLY ESTIMATING FOOD PORTION SIZES

CROSS REFERENCE TO RELATED APPLICATION

This application is closely related to and claims priority from U.S. Provisional Patent Application Ser. No. 60/826,404 filed on Sep. 21, 2006.

FIELD OF THE INVENTION

The present invention relates, in general, to devices used to measure quantities of food and, more particularly, the invention relates to a display having each portion thereof equivalent to a predetermined food portion size for providing an individual with a visual reference to estimate an amount of food such individual is eating.

BACKGROUND OF THE INVENTION

Prior to the conception and development of the present invention, as is generally well known in the prior art, many people on restricted diets or trying to lose weight have had difficulty estimating food portion sizes.

In the United States it has recently been estimated that 40% of women and 25% of men are trying to lose weight. Food portion control is key for helping people to avoid overeating, lose weight, improve their health, and manage health conditions such as diabetes.

The portion sizes and equivalent calorie intake labeled on food packaging is important for people to adhere to when trying to maintain a healthy body. For example, just eating a hundred extra calories a day can mean a ten pound weight gain in a year.

SUMMARY OF THE INVENTION

The present invention provides a display having each portion thereof equivalent to a predetermined food portion size for providing an individual with a visual reference to estimate an amount of food such individual is eating. The display includes at least one figurine having a body member with a predetermined shape. The body member includes a label for identifying a portion size that it is equivalent to. A head member, having a predetermined shape, is attached to the body member. The head member includes a label for identifying a portion size that it is equivalent to. A predetermined plurality of at least one of leg members and arm members, having a predetermined shape, are attached to the body member. Each one of the predetermined pluralities of at least one of leg members and arm members includes a label for identifying a portion size that each one is equivalent to.

OBJECTS OF THE INVENTION

It is, therefore, one of the primary objects of the present invention to provide a display wherein each part thereof is equivalent to a particular food portion size for providing an individual with a visual reference to estimate an amount of food they are eating.

Another object of the present invention is to provide a display for visually estimating food portion sizes that is easier to use than measuring food with measuring cups and spoons.

Still another object of the present invention is to provide a display for visually estimating food portion sizes that is washable and portable.

Yet another object of the present invention is to provide a display for visually estimating food portion sizes that is relatively easy to manufacture.

A further object of the present invention is to provide a display for visually estimating food portion sizes that is relatively inexpensive to make.

In addition to the various objects and advantages of the present invention described with some degree of specificity above it should be understood that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
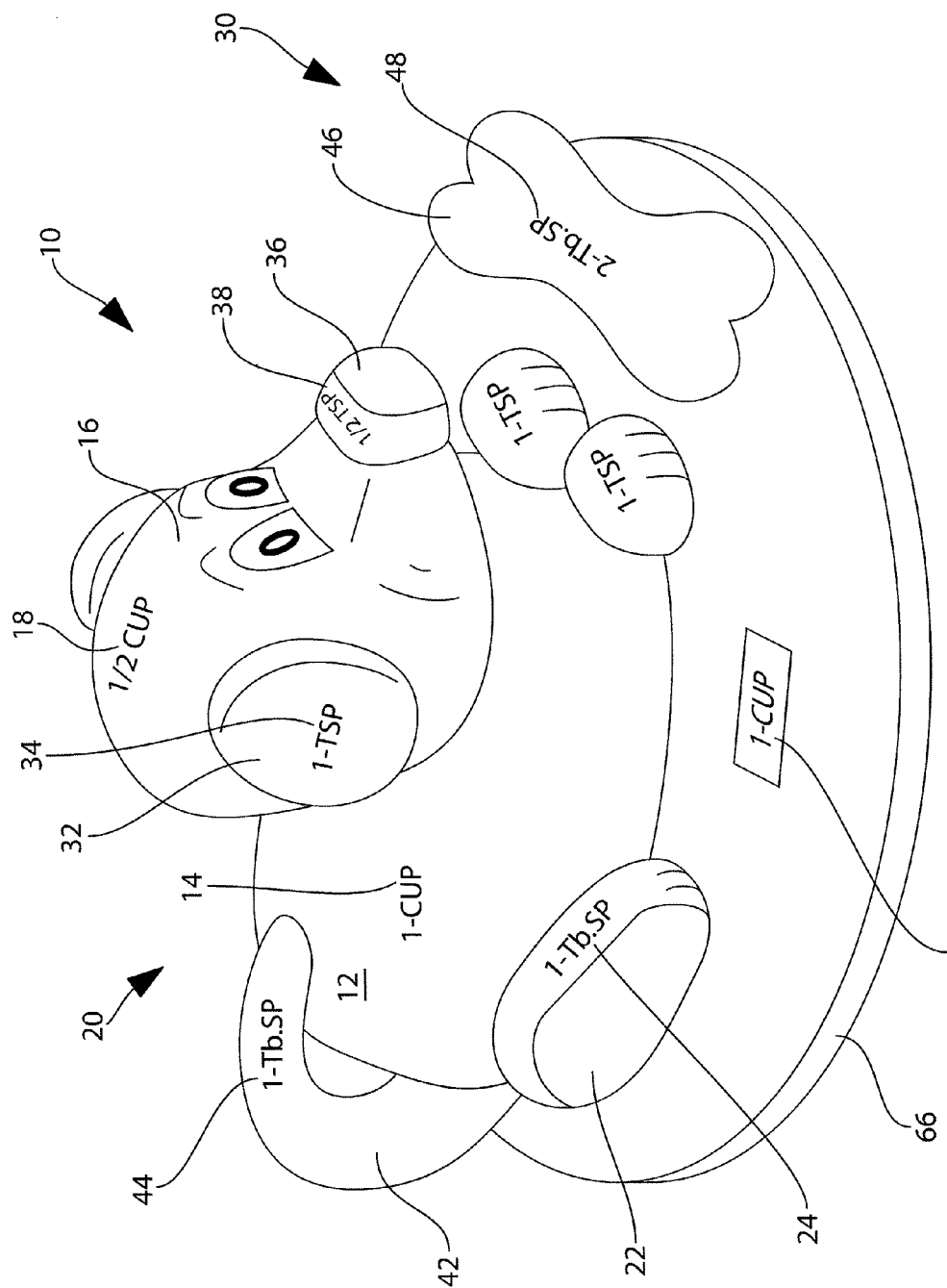
FIG. 1 is a perspective view of a display that includes an animal shaped figurine according to one aspect of the present invention.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
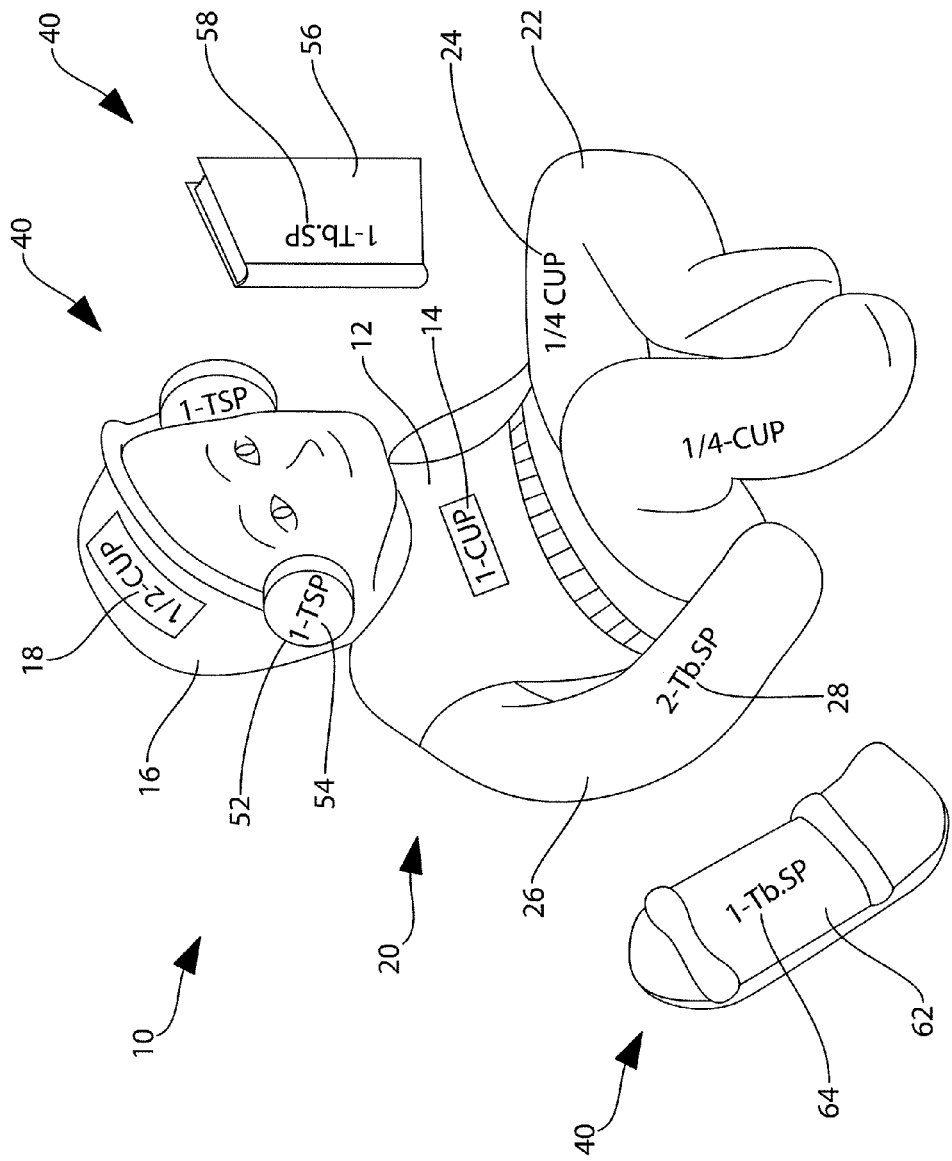
FIG. 2 is a perspective view of a display that includes a human shaped figurine according to another aspect of the present invention.

Reference is now made, more particularly, to drawing FIGS. 1 and 2, illustrated therein is a display, generally designated 10, having each portion thereof equivalent to a predetermined food portion size for providing an individual with a visual reference to estimate an amount of food the individual is eating. Display 10 includes at least one figurine, generally designated 20, that includes a body member 12 having a predetermined shape. Body member 12 includes a label 14 for identifying a portion size that body member 12 is equivalent to.

A head member 16, having a predetermined shape, is attached to body member 12. Head member 16 includes a label 18 for identifying a portion size that head member 16 is equivalent to.

A predetermined plurality of at least one of leg members 22 and arm members 26, having a predetermined shape, are attached to body member 12. Each of leg members 22 includes a label 24 and each of arm members 26 includes a label 28 for identifying a portion size that each one is equivalent to.

Figurine 20 may be shaped like any type of animal, such as the puppy illustrated in FIG. 1. The animal shaped figurine may include ear members 32, having a predetermined shape, that are attached to head member 16. Each of ear members 32 includes a label 34 for identifying a portion size that ear members 32 is equivalent to.

The animal shaped figurine may further include a nose member 36, having a predetermined shape that is attached to head member 16. Nose member 36 includes a label 38 for identifying a portion size that nose member 36 is equivalent to.

The animal shaped figurine may also further include a tail member 42, having a predetermined shape that is attached to body member 12. Tail member 42 includes a label 44 for identifying a portion size that tail member 42 is equivalent to.

Display 10 may further include a predetermined accessory item, generally designated 30, that the animal shaped figurine typically would be associated with, such as a bone 46 illustrated in FIG. 1. Now if the animal shaped figurine was a cat, for example, the accessory item might be a fish (not shown). Bone 46 includes a label 48 for identifying a portion size that it is equivalent to.

Figurine 20 may be shaped like a person illustrated in FIG. 2. Display 10 may further include a predetermined activity item, generally designated 40, that the human shaped figurine typically would use, such as a headset 52, a book 56, or a skateboard 62. Headset 52 includes a label 54, book 56 includes a label 58, and skateboard 62 includes a label 64 for identifying a portion size that each item is equivalent to.

Display 10 may further include a substantially planar base member 66 (shown in FIG. 1), having a predetermined size, for placing figurine 20 thereon. Base member 66 includes a label 68 for identifying a portion size that base member 66 is equivalent to. Also, each portion of display 10 is, preferably, manufactured from plastic, ceramic, clay, wood, or various combinations thereof.

It should be noted that figurine 20 could be a number of different things besides an animal, or a person without departing from the scope of the invention. For example, figurine 20 could be shaped like insects, robots, cartoon characters, etc.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A figurine shaped display comprising:
   a body member,
   a head member attached to said body member,
   a predetermined plurality of at least one of leg members and arm members attached to said body member,
   said body member, head member and predetermined plurality of at least one of leg members and arm members defining equivalents to food portion sizes and,
   labels disposed on said body member, head member and predetermined plurality of at least one of leg members and arm members, each label identifying a respective food portion size defined by a portion on said body member, head member and predetermined plurality of at least one of leg members and arm members.

2. A display, according to claim 1, wherein said figurine includes an animal shaped figurine.

3. A display, according to claim 2, wherein said animal shaped figurine includes ear members having a predetermined shape and attached to said head member, each of said ear members being sized or shaped equivalent to a specific food portion size and including a label for identifying said specific food portion size that said ear members are equivalent to.

4. A display, according to claim 2, wherein said animal shaped figurine includes a nose member having a predetermined shape and attached to said head member, said nose member being sized or shaped equivalent to a specific food portion size and including a label for identifying said specific food portion size that said nose member is equivalent to.

5. A display, according to claim 2, wherein said animal shaped figurine includes a tail member having a predetermined shape and attached to said body member, said tail member being sized or shaped equivalent to a specific food portion size and including a label for identifying said specific food portion size that said tail member is equivalent to.

6. A display, according to claim 2, wherein said display further includes a predetermined accessory item that said animal shaped figurine typically would be associated with, said predetermined accessory item sized and/or shaped equivalent to a respective food portion size and including a label disposed on a surface thereof for identifying said respective food portion size that said predetermined accessory item is equivalent to.

7. A display, according to claim 1, wherein said at least one figurine includes a human shaped figurine.

8. A display, according to claim 7, wherein said display further includes a predetermined activity item that said human shaped figurine typically would use, said predetermined activity item sized and/or shaped equivalent to a respective food portion size and including a label disposed on a surface thereof for identifying said respective food portion size that said predetermined activity item is equivalent to.

9. A display, according to claim 1, wherein each portion of said display is manufactured from one of plastic, ceramic, clay, wood and various combinations thereof.

10. The display of claim 1, further comprising a generally planar base member sized and/or shaped as an equivalent to a selected food portion size, said base member including a label disposed on a top surface thereof for identifying said selected portion size that said base member is equivalent to, wherein said figurine shaped display is positioned on said top surface of base member.

* * * * *